(12) United States Patent
Johnson et al.

(10) Patent No.: US 7,006,329 B2
(45) Date of Patent: Feb. 28, 2006

(54) MAGNETIC TAPE HEAD ASSEMBLY WITH LATERALLY MOVEABLE CENTRAL SECTION

(75) Inventors: Douglas W. Johnson, Stillwater, MN (US); Christopher J. Zwettler, Lake Elmo, MN (US); Saeed A. Fahimi, Bloomington, MN (US)

(73) Assignee: Imation Corp., Oakdale, MN (US)

( * ) Notice: Subject to any disclaimer, the term of this patent is extended or adjusted under 35 U.S.C. 154(b) by 358 days.

(21) Appl. No.: 10/452,465

(22) Filed: Jun. 2, 2003

(65) Prior Publication Data

US 2004/0240113 A1    Dec. 2, 2004

(51) Int. Cl.
   *G11B 5/54*    (2006.01)
(52) U.S. Cl. .................. 360/221; 360/231; 360/251.1; 360/261.1
(58) Field of Classification Search ................ 360/221, 360/231, 251.1, 261.1
   See application file for complete search history.

(56) References Cited

U.S. PATENT DOCUMENTS

| | | | |
|---|---|---|---|
| 4,695,909 A | * | 9/1987 | Momata et al. ............. 360/221 |
| 5,893,526 A | | 4/1999 | Zwettler |
| 6,014,293 A | | 1/2000 | Casey et al. |
| 6,122,147 A | * | 9/2000 | Fahimi et al. ............... 360/221 |
| 6,229,669 B1 | | 5/2001 | Beck et al. |
| 6,343,757 B1 | | 2/2002 | Zwettler |
| 6,373,656 B1 | | 4/2002 | Poorman et al. |
| 6,405,957 B1 | | 6/2002 | Alexander et al. |
| 6,433,959 B1 | | 8/2002 | Lakshmikumaran et al. |
| 6,937,435 B1 | * | 8/2005 | Saliba ......................... 360/122 |

FOREIGN PATENT DOCUMENTS

WO    WO 8906425 A1 *   7/1989

* cited by examiner

*Primary Examiner*—William J Klimowicz
(74) *Attorney, Agent, or Firm*—Eric D. Levinson

(57) ABSTRACT

A magnetic head assembly in a linear tape system. The magnetic head assembly includes a magnetic head having a central section, a first outrigger, and a second outrigger. The central section maintains at least one read/write element. The first outrigger is positioned adjacent the central section and forms at least one air bleed slot. The second outrigger is positioned adjacent the central section opposite the first outrigger and also forms at least one air bleed slot. Finally, the central section is laterally moveable relative to the outriggers. With this configuration, the moveable, central section, otherwise used for lateral positioning of the read/write element relative to a magnetic tape, is separated from the outriggers that otherwise minimize a fly height between the magnetic tape and the outriggers.

20 Claims, 4 Drawing Sheets

MAGNETIC TAPE HEAD ASSEMBLY WITH LATERALLY MOVEABLE CENTRAL SECTION

CROSS-REFERENCE TO RELATED APPLICATIONS

This application is related to, and incorporates by reference an entirety of, U.S. patent application Ser. No. 10/452,334 entitled "Data Storage Tape Cartridge With Subambient Pressure Feature," filed on even date herewith, now U.S. Pat. No. 6,874,720.

BACKGROUND OF THE INVENTION

The present invention relates to magnetic tape read/write heads. More particularly, it relates to a magnetic tape head assembly adapted to facilitate lateral movement of a read/write element relative to other head assembly components.

Magnetic tape systems for recording, reproducing, and/or erasing magnetic information in a linear tape system generally consists of a magnetic tape traveling along a magnetic head assembly. The magnetic head assembly includes a magnetic head that provides a surface (typically contoured) for guiding the magnetic tape across one or more read/write elements otherwise maintained by the head. A common concern associated with these systems is the formation of an air bearing between the tape and the magnetic head. This air bearing can cause hydrodynamic lift of the tape relative to the magnetic head, leading to performance deterioration. The primary consequences of a higher tape fly height are a decrease in read amplitude and an upward shift in the peak write current. Conversely, the read amplitude increases as the fly height decreases. In light of these concerns, substantial efforts have been made to design features into the magnetic head that remove entrained air and/or minimize air bearing formation.

Intimate contact between the tape and the magnetic head at the interface is typically increased by a combination of greater tape tension across the magnetic head and more penetration of the magnetic head into the tape. Another approach to minimizing fly height on cylindrical magnetic heads is to incorporate bleed slots. Bleed slots are grooves in the contoured surface of the magnetic head. As the tape moves across the head, the bleed slots help to channel entrained air away from the head-to-tape interface, thus reducing the height distribution of the layer of air. Thus, bleed slots function in a manner that is analogous to treads on a tire. Just as the tire treads help to channel water away from the tire surface to prevent hydroplaning, bleed slots help to channel away air from the head contour surface to minimize head-to-tape separation. Alternatively, and/or in addition, an ambient pressure head contour has been suggested in which a substantially square edge is introduced into the tape path for generating a subambient condition as the tape interfaces with the edge. An example of this approach is provided in U.S. Pat. No. 6,122,147, the teachings of which are incorporated herein by reference.

Regardless of the exact design techniques implemented to reduce hydrodynamic lift, other concerns may arise. In particular, most magnetic tapes provide a series of parallel tracks to which data is written. The read/write heads maintained by the magnetic head assembly must be moved quickly and positioned over particular data tracks as data is read or recorded. The head must move in a lateral fashion (perpendicular to tape movement) to move the read/write element from track to track. Further, servo control systems are often employed to properly position the read/write elements in the translating direction. A designated element on the magnetic head (e.g., a magnetic servo read head) "follows" a servo track on the tape to properly position the magnetic head relative to the tape. Thus, when the tape moves laterally, the magnetic head must also move laterally, dictated by the servo track/servo head interface. Thus, it is known to provide magnetic head assemblies with an actuator that laterally translates the head itself. Unfortunately, due to the extremely low fly heights achieved with various magnetic head assembly designs, lateral movement of the head may undesirably "drag" the tape in a lateral fashion as well.

For example, FIG. 1 provides a schematic illustration of a magnetic head 10 in conjunction with a tape 12 (for ease of illustration, the tape 12 is illustrated as being transparent so that components "behind" the tape 12 can be viewed). The magnetic head 10 includes a front face 14 at which read/write elements 16 are located. Further, air bleed slots 18 are formed at opposite sides of the read/write elements 16. The magnetic head 10 is laterally moveable relative to the tape 12 (shown by arrows in FIG. 1), driven by an actuator mechanism (not shown). The air bleed slots 18 reduce the air bearing between the tape 12 and the front face 14. Due to this reduction in fly height, lateral movement of the magnetic head 10 during a track access operation may drag the tape 12 in a similar lateral fashion, possibly leading to performance errors.

Reduction of the fly height between a tape and a magnetic head is highly desirable. However, in achieving this goal, other performance concerns may arise due to the magnetic head imparting lateral movement onto the tape. Therefore, a need exists for a magnetic head assembly configured to minimize the propensity of the magnetic head to "drag" the tape during track access operations.

SUMMARY OF THE INVENTION

One aspect of the present invention relates to a magnetic head assembly in a linear tape system. The magnetic head assembly includes a magnetic head comprised of a central section, a first outrigger, and a second outrigger. The central section maintains at least one read/write element. The first outrigger is positioned adjacent the central section and forms at least one air bleed slot. The second outrigger is positioned adjacent the central section opposite the first outrigger and also forms at least one air bleed slot. Finally, the central section is laterally moveable relative to the outriggers. With this configuration, the moveable, central section, otherwise used for lateral positioning of the read/write element relative to a magnetic tape, is separated from the outriggers that otherwise minimize a fly height between the magnetic tape and the outriggers. In one preferred embodiment, one or both of the outriggers include an edge projection adapted to frictionally engage the tape as the tape traverses the head.

Another aspect of the present invention relates to a method of operating a magnetic tape system for recording, reproducing, and/or erasing magnetic information relative to a magnetic tape of a linear tape system. The method includes providing a magnetic head assembly including a magnetic head having a central section and opposing outriggers positioned at opposite longitudinal sides of the central section. The central section maintains at least one read/write element. The tape is moved longitudinally across the magnetic head. During this tape movement, the central section is moved laterally relative to the outriggers. In one preferred embodiment, the lateral movement of the central section is performed as part of a track following operation, with the outriggers remaining spatially fixed.

Yet another aspect of the present invention relates to a magnetic tape system for recording, reproducing, and/or erasing magnetic information in a linear tape system. The magnetic tape system includes a magnetic tape and a magnetic head assembly. The magnetic head assembly includes a magnetic head having a central section, and first and second outriggers. The central section maintains at least one read/write element. The first and second outriggers are positioned adjacent opposite sides of the central section, and each form at least one air bleed slot. Finally, the central section is laterally moveable relative to the outriggers. In one preferred embodiment, at least one of the outriggers forms a longitudinal slot for laterally constraining the magnetic tape as the tape moves longitudinally across the outrigger.

DETAILED DESCRIPTION OF THE PREFERRED EMBODIMENTS

Figure 1:
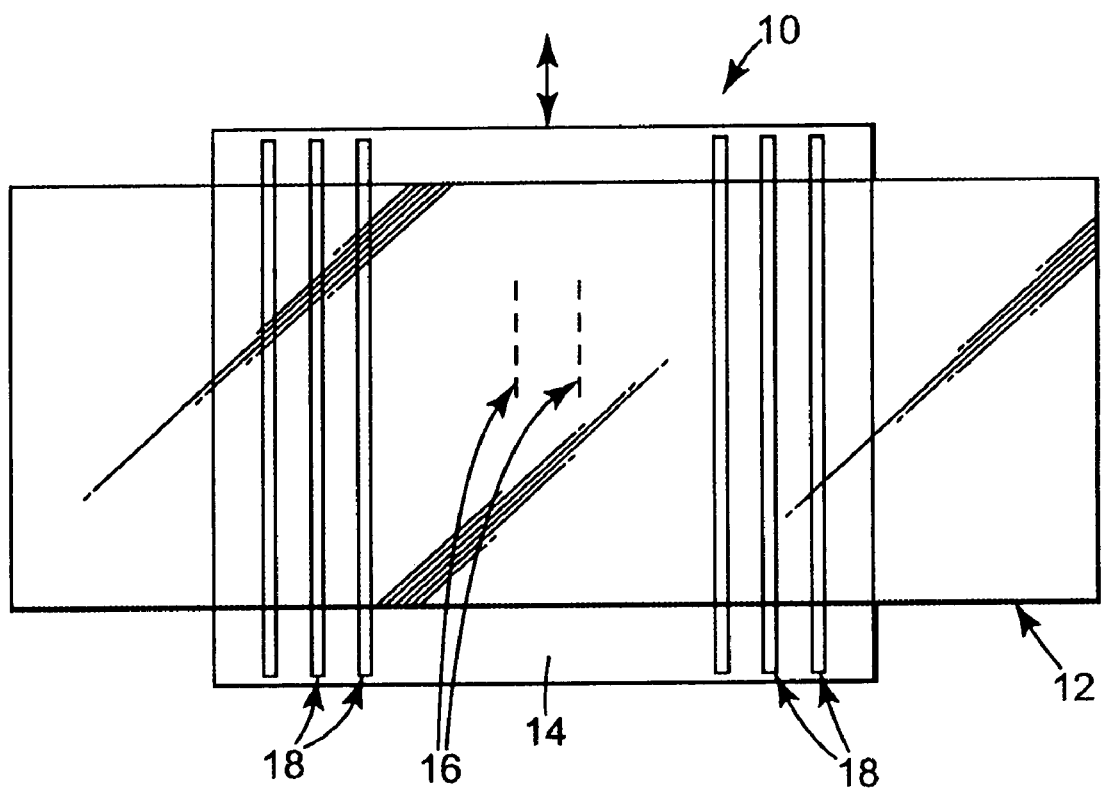
FIG. 1 is a schematic illustration of a prior art magnetic tape system.
Figure 2:
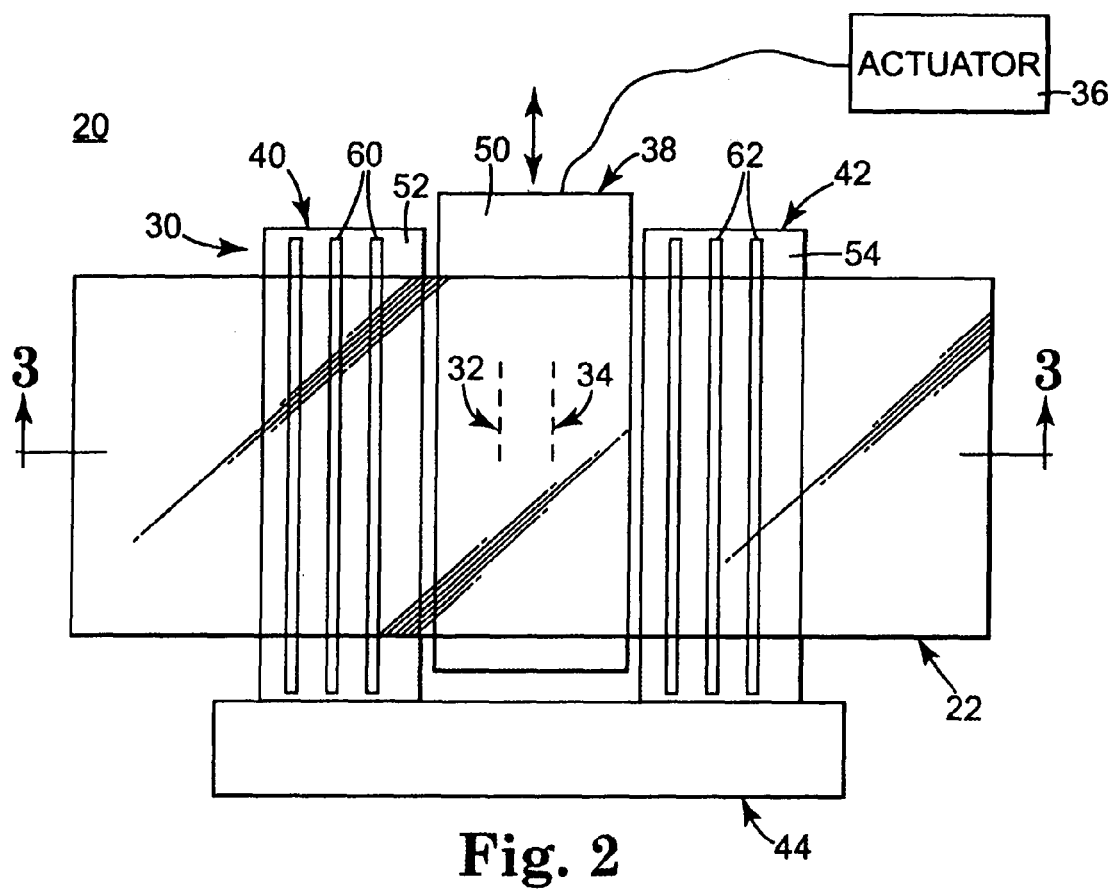
FIG. 2 is a schematic, front view of a magnetic tape system including a magnetic head assembly in accordance with the present invention.
Figure 3:
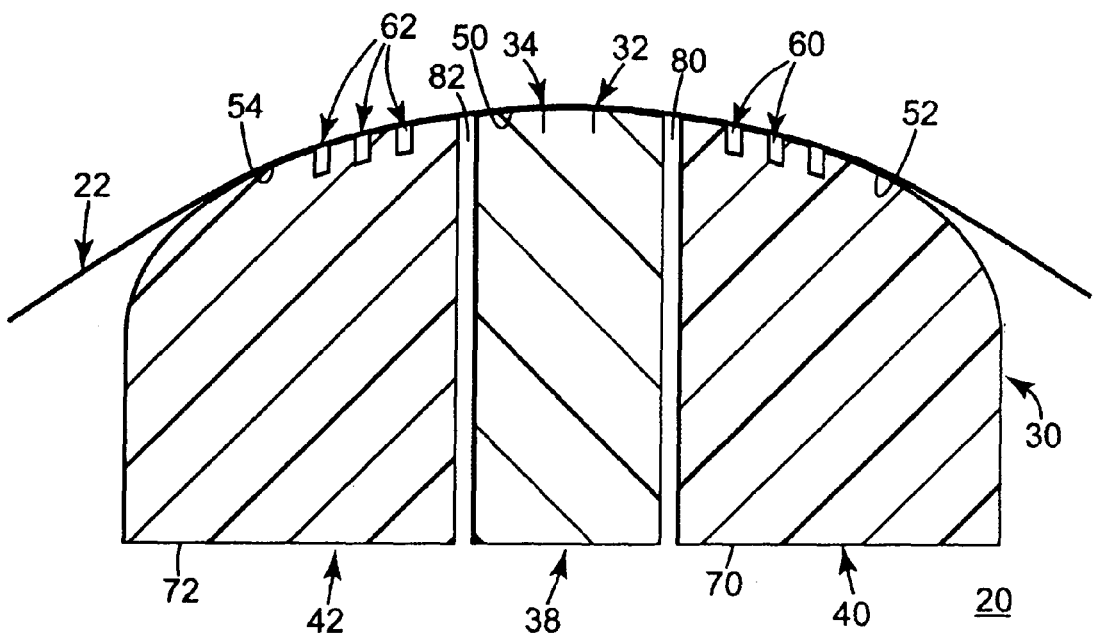
FIG. 3 is an enlarged top view of the magnetic tape system of FIG. 2.

FIGS. 2 and 3 illustrate various views of a magnetic head assembly 20 for recording, reproducing, and/or erasing magnetic information in a track of a flexible, magnetic tape 22 in accordance with the present invention. For ease of illustration, the tape 22 is shown in FIG. 2 as being transparent to facilitate identification of components behind the tape 22. It should be understood, however, that the tape 22 can assume a wide variety of forms known in the art, and thus may not be transparent.

The magnetic head assembly 20 includes a magnetic head 30, read/write elements 32, 34, and an actuator 36 (shown in block form). As described in greater detail below, the read/write element 32, 34 are maintained by the magnetic head 30, and in particular by a central section 38 thereof. The central section 38 is laterally moveable relative to other portions of the magnetic head 30, and is connected to the actuator 36. In general terms, during use, as the tape 22 is moved across the magnetic head 30, the central section 38 (and thus the read/write elements 32, 34) is periodically moved laterally (relative to a direction of tape travel) as prompted by the actuator 36. In this regard, other portions of the head 30 remain spatially fixed relative to the central section 38 and the tape 22.

In addition to the central section 38, the magnetic head 30 preferably includes first and second outriggers 40, 42, and a base 44. The central section 38 and the first and second outriggers 40, 42 define a tape-receiving contour for the head 30 that can assume a variety of forms known in the art.

As best shown in FIG. 3, the central section 38 and the outriggers 40, 42 each define a front face 50, 52, 54, respectively, that combine to define a generally cylindrical head contour. Alternatively, other contours are equally acceptable, and additional features can be provided, as described below (e.g., substantially square corners formed in one or both of the outriggers 40, 42). Regardless of exact design, however, the central section 38 is centered between the first and second outriggers 40, 42, and is laterally moveable relative to the outriggers 40, 42. That is to say, the outriggers 40, 42 constitute spatially fixed components of the magnetic head 30, whereas the central section 38 is laterally moveable. Further, a mass of the control section 38 is, in one embodiment, less than a combined mass of the outriggers 40, 42; in another embodiment, a mass of the central section is less than a mass of either of the outriggers 40, 42. These preferred mass relationships facilitate movement of the central section 38 relative to the outriggers 40, 42 as described below.

The central section 38 maintains the read/write elements 32, 34 in accordance with any known technique. For example, the central section 38 preferably consists of a substrate body upon which the thin film magnetic read/write elements 32, 34 are deposited. In this regard, more or less than two of the read/write elements 32, 34 can be provided with the central section 38. Preferably, however, the central section 38, and in particular the front face 50, is characterized by the absence of any features adapted to reduce a fly height of the tape 22 relative to the front face 50 and/or create a subambient condition between the tape 22 and the front face 50. For example, the central section 38 preferably does not include an air bleed slot or corner edge projecting beyond the desired contour of the magnetic head 30 (for example, as described in U.S. Pat. No. 6,122,147). Thus, as the tape 22 moves across the front face 50 of the central section 38, no additional drag is imparted onto the tape 22 by the central section 38. As a result, lateral movement of the central section 38 is not transferred to the tape 22. In one embodiment, a width of the central section 38 is greatly decreased relative to a width of the outriggers 40, 42 so to promote rapid movement of the central section 38 (and thus the read/write elements 32, 34) during a high density track following operation. For example, a width of the central section 38 can approximate a gap width of the read/write elements 32, 34.

In contrast, the first and second outriggers 40, 42 preferably include one or more features adapted to reduce the tape fly height or otherwise remove air entrained between the tape 22 and the respective outrigger 40, 42. For example, with the embodiments of FIGS. 2 and 3, each of the outriggers 40, 42 preferably defines a plurality of air bleed slots 60, 62, respectively. The air bleed slots 60, 62 preferably have a width (measured in a direction perpendicular to tape movement) greater than a width of the tape 22, such that air entrained between the tape 22 and the respective outrigger 40, 42 is removed. Thus, the air pressure behind the tape 22 is generally at ambient (designated PA). Notably, while each of the outriggers 40, 42 are illustrated in FIGS. 2 and 3 as forming three of the air bleed slots 60, 62, any other number, either greater or lesser, is equally acceptable.

The outriggers 40, 42 are rigidly attached to one another via the base 44. Alternatively, other structures effectuating this rigid attachment are equally acceptable, such as a platform or similar body interconnecting corresponding back sides (shown generally in FIG. 3 at 70, 72, respectively) of the outriggers 40, 42. Regardless, the central section 38 is not rigidly attached to the base 44 (or other structure rigidly connecting the first and second outriggers 40, 42), such that the central section 38 is laterally translatable relative to the first and second outriggers 40, 42. To this end, the magnetic head 30 may include an additional mechanism that non-rigidly connects the central section 38 to one or both of the outriggers 40, 42 and the base 44. However, this mechanism will not prevent lateral movement of the central section 38 relative to the outriggers 40, 42. For example, the central section 38 can be slidably connected to the first and second outriggers 40, 42. Alternatively, or in addition, the central section 38 can be connected to the base 44 via a supporting device that permits vertical movement (relative to the orientation of FIG. 2), such as a spring-type device.

Upon final assembly, a gap 80, 82 is defined between the central section 38 and each of the outriggers 40, 42. The gaps 80, 82 ensure that the central section 38 can freely move relative to the outriggers 40, 42, and provide an additional avenue for entrained air to be removed from behind the tape 22. Preferably, however, the gaps 80, 82 are as small as possible.

The actuator 36 can assume a variety of forms related to the mechanism(s) and/or device(s) maintaining the central section 38 relative to the outriggers 40, 42. In a preferred embodiment, the actuator 46 is a servo-controlled device, adapted to effectuate lateral movement of the central section 38 in a desired fashion. Servo-controlled linear actuators are known, normally employed to laterally move an entirety of a magnetic head.

During use, the tape 22 is moved across the magnetic head 30. To this end, the magnetic head 30 is preferably bi-directional. Thus, when the tape 22 is moved left-to-right (relative to the orientations of FIGS. 2 and 3), air entrained between the tape 22 and the first outrigger 40 is removed via the air bleed slots 60. Conversely, when the tape 22 moves from right-to-left, air entrained between the tape 22 and the second outrigger 42 is removed via the air bleed slots 62. In either case, a substantially ambient pressure or even subambient pressure (i.e., negative gauge pressure) is established between the tape 22 and the corresponding outrigger 40, 42, thereby reducing hydrodynamic lift of the tape 22 relative to the head 30. As part of normal magnetic tape system operations, it may become necessary to laterally move the read/write elements 32, 34 relative to the tape 22, such as part of a track following operation employed with servo-tracking systems. The actuator 36 is operated to laterally translate or move the central section 38 relative to the tape 22 so as to satisfy this track following operation. The first and second outriggers 40, 42 do not move with the central section 38, but instead remain stationary. As a result, the various features of the magnetic head 30 that otherwise facilitate low fly height and/or ambient or subambient pressure conditions do not move, thereby reducing the propensity of the magnetic head 30 to "drag" the tape 22 during the track following operation (or any other operation in which lateral movement of the read/write elements 32, 34 is desired).

Figure 4:
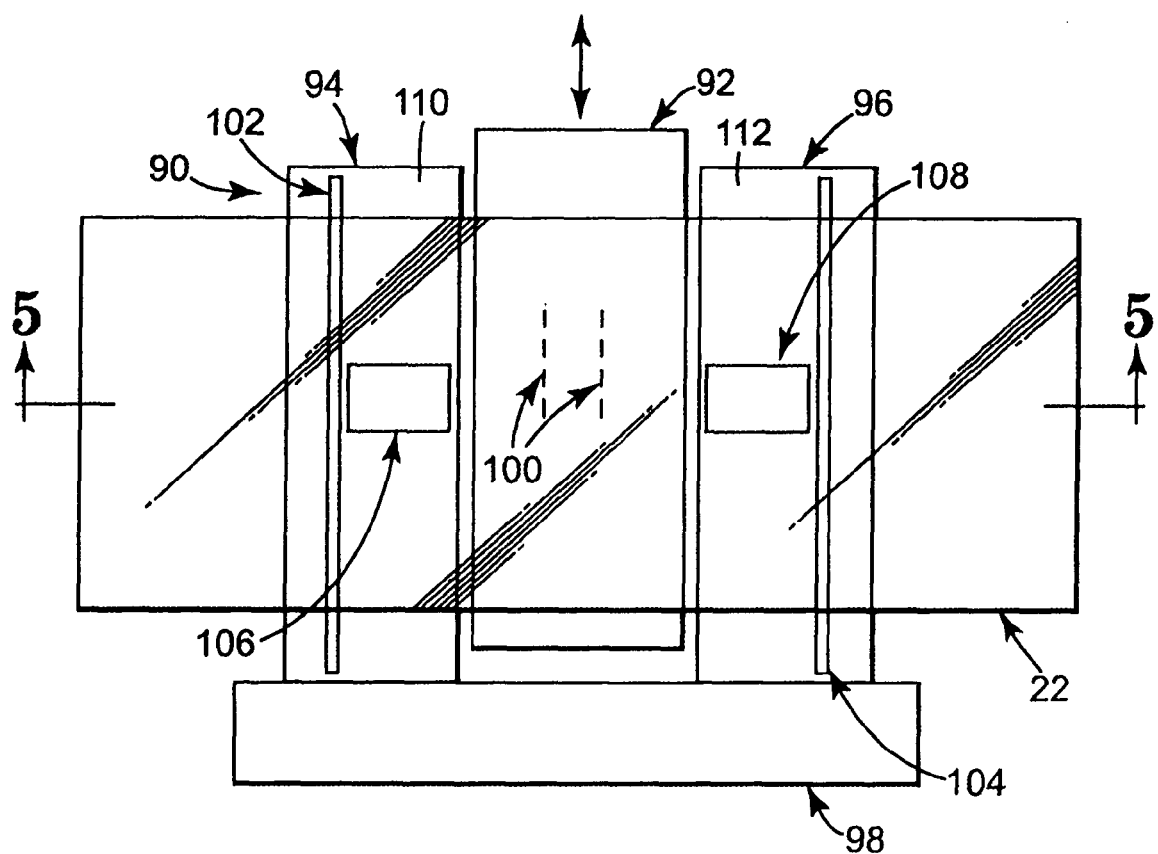
FIG. 4 is a schematic, front view of a magnetic tape system including an alternative embodiment magnetic head in accordance with the present invention.

As described above, the magnetic head assembly 20, and in particular the magnetic head 30, in accordance with the present invention may incorporate a number of other features designed to reduce hydrodynamic lift of the tape 22 or otherwise minimize lateral tape movement. For example, FIG. 4 illustrates an alternative embodiment magnetic head 90 in accordance with the present invention in conjunction with the tape 22. As with previous embodiments, the magnetic head 90 includes a central section 92, a first outrigger 94, and a second outrigger 96. The first and second outriggers 94, 96 are positioned adjacent the central section 92, at opposite sides thereof, and are rigidly connected to one another via a base 98 (or other structure). The central section 92 maintains one or more read/write elements 100 and is laterally moveable relative to the first and second outriggers 94, 96, such as via operation of an actuator (not shown).

Each of the outriggers 94, 96 preferably forms at least one air bleed slot 102, 104, respectively. In addition, each of the outriggers 94, 96 provides a tape locking feature in the form of a longitudinal slot 106, 108, formed in a front face 110, 112, respectively, thereof. The slots 106, 108 each have a width (measured in a direction perpendicular to tape movement) less than a width of the corresponding outrigger 94, 96, and thus of the tape 22. More preferably, the slots 106, 108 have a width less than one-half a width of the tape 22, even more preferably less than one-third a width of the tape 22.

Figure 5:
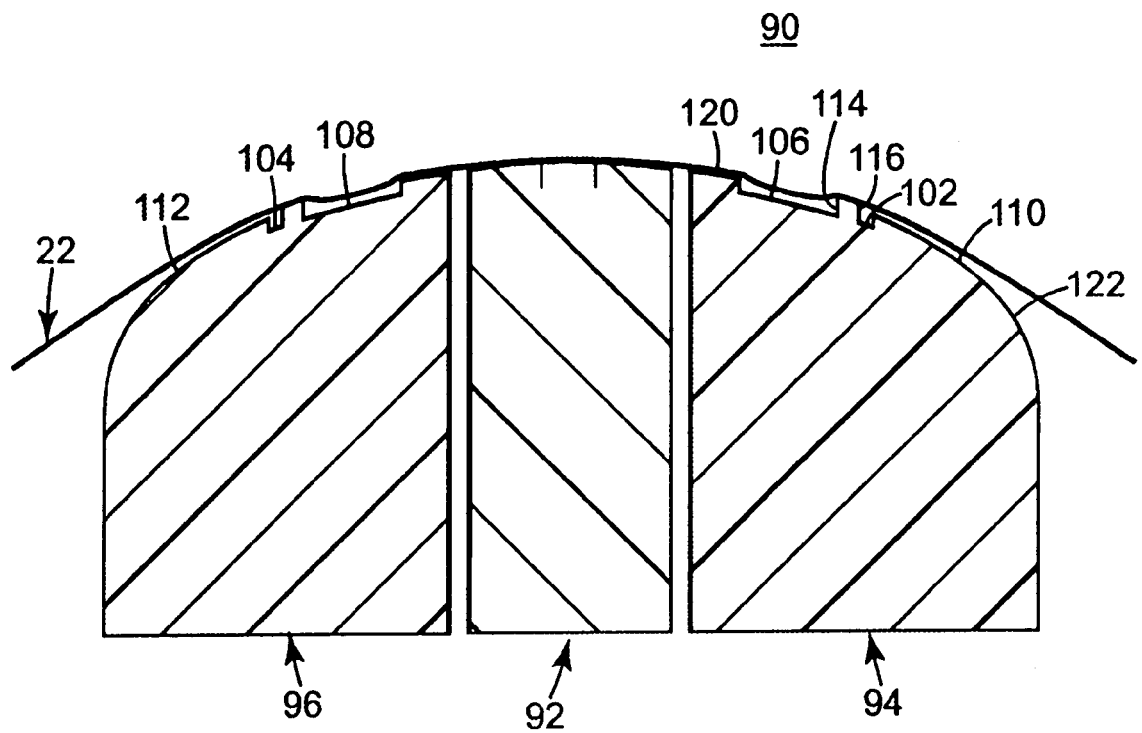
FIG. 5 is an enlarged top view of the magnetic tape system of FIG. 4.
Figure 6:
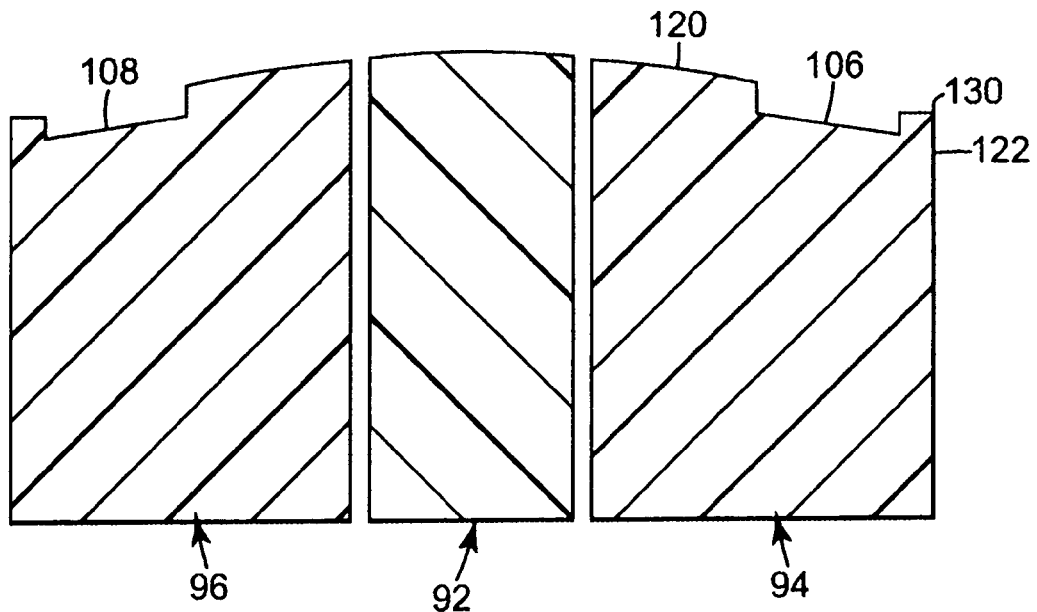
FIG. 6 is an enlarged top view of an alternative embodiment magnetic head in accordance with the present invention.

The slots 106, 108 are adapted to suppress high frequency lateral tape motion. For example, with respect to the first outrigger 94 and left-to-right tape motion (relative to the orientation of FIG. 4), as the tape 22 passes over the air bleed slot 102, an ambient or even subambient (or negative gauge) pressure condition is created. This pressure condition forces the tape 22 into the longitudinal slot 106, effectively locking or keying the tape 22 within the longitudinal slot 106, thereby resisting the tendency of the tape 22 to laterally move with movement of the central section 92. In this regard, the desired pressure condition at the slot 106 can be further enhanced by forming a substantially square corner or edge at or adjacent to a leading edge 114 of the longitudinal slot 106. For example, FIG. 5 illustrates the magnetic head 90 with a substantially square edge 116 adjacent the leading side 114 of the longitudinal slot 106. Air entrained behind the magnetic tape 22 is obstructed at the edge 116, creating a reduced or subambient pressure condition at the longitudinal slot 106. Regardless, the longitudinal slot 106 is preferably positioned proximate an exit side 120 of the first outrigger 94, with the air bleed slot 102 positioned between the longitudinal slot 106 and an entrance side 122 of the outrigger 94. Alternatively, as shown in FIG. 6, a square corner or edge 130 can be provided at the entrance side 122 of the outrigger 94 (and/or a contour of the entrance side 122 altered to create a tape overwrap relative to the outrigger 94), with the longitudinal slot 106 located adjacent the edge 130. While only the first outrigger 94 has been described in detail, it should be understood that the second outrigger 96 is preferably identically formed. Further, two or more of the longitudinal slots 106 or 108 can be formed in one or both of the corresponding outriggers 94 or 96.

During use, the magnetic head 90 operates in a fashion similar to the previous embodiments. In particular, the tape 22 is moved across the magnetic head 90, either left-to-right, or right-to-left. With respect to left-to-right tape movement (and the orientation of FIG. 4), pressure conditions at the outrigger 94 cause the tape 22 to extend within the longitudinal slot 106, thereby establishing a relatively fixed lateral position of the tape 22. During a track following operation, the central section 92 is caused to laterally move relative to the tape 22, and the first and second outriggers 94, 96, as previously described. As part of this lateral movement, the tape 22 is constrained from "following" the lateral central section 92 movement due to interaction between the tape 22 and the first outrigger 94 that is otherwise fixed relative to the central section 92. Conversely, with right-to-left movement, the tape 22 is captured within the slot 108 of the second outrigger 96.

The magnetic head and assembly, and related magnetic tape system and method of use thereof, of the present invention provides a marked improvement over previous designs. By separating a central section of the magnetic head that otherwise maintains the read/write element(s) from portions of the head that otherwise establish or enhance low fly heights, the read/write element(s) can be laterally moved apart from other portions of the magnetic head. This, in turn, allows for accurate track following operations while minimizing the opportunity for corresponding lateral tape movement.

Although the present invention has been described with reference to preferred embodiments, workers skilled in the art will recognize that changes can be made in form and detail without departing from the spirit and scope of the present invention.

What is claimed is:

1. A magnetic head assembly in a linear tape system, comprising:
    a magnetic head including:
        a central section maintaining at least one read/write element;
        a first outrigger adjacent the central section and forming at least one air bleed slot; and
        a second outrigger adjacent the central section opposite the first outrigger, the second outrigger forming at least one air bleed slot;
        wherein the central section is laterally moveable relative to the outriggers.

2. The magnetic head assembly of claim 1, wherein the magnetic head further includes:
    a base rigidly attached to the first and second outriggers;
    wherein the central section is not rigidly attached to the base.

3. The magnetic head assembly of claim 1, wherein the central section is characterized by the absence of an air bleed slot.

4. The magnetic head assembly of claim 1, further comprising:
    an actuator for laterally moving the central section relative to the outriggers.

5. The magnetic head assembly of claim 1, wherein the first outrigger further includes a subambient pressure feature configured to limit lateral tape movement relative to the first outrigger as the magnetic tape moves longitudinally across the first outrigger.

6. The magnetic head assembly of claim 5, wherein the subambient pressure feature includes a substantially square edge.

7. The magnetic head assembly of claim 5, wherein the second outrigger further includes a subambient pressure feature configured to limit lateral tape movement of a magnetic tape relative to the second outrigger as the magnetic tape moves longitudinally across the second outrigger.

8. The magnetic head assembly of claim 1, wherein the first outrigger defines a longitudinal slot for laterally constraining a magnetic tape as the magnetic tape moves longitudinally across the first outrigger.

9. The magnetic head assembly of claim 8, wherein the first outrigger defines a width measured in a direction perpendicular to tape travel, and further wherein the longitudinal slot has a width not more than one-half a width of the first outrigger.

10. The magnetic head assembly of claim 9, wherein the longitudinal slot has a width of not more than one-half a width of the tape.

11. The magnetic head assembly of claim 8, wherein the first outrigger defines an exit side adjacent the central section and an entrance side opposite the exit side, and further wherein the longitudinal slot extends proximate the exit side.

12. The magnetic head assembly of claim 11, wherein at least one air bleed slot is formed between the longitudinal slot and the entrance side.

13. The magnetic head assembly of claim 8, wherein the second outrigger defines a longitudinal slot for laterally constraining a magnetic tape as the magnetic tape moves longitudinally across the second outrigger.

14. A method of operating a magnetic tape system for recording, reproducing, and/or erasing magnetic information relative to a magnetic tape of a linear tape system, the method comprising:
    a) providing a magnetic head assembly including a magnetic head having a central section and opposing outriggers positioned at opposite longitudinal sides of the central section, the central section maintaining at least one read/write element;
    b) moving the tape longitudinally across the magnetic head; and
    c) laterally moving the central section relative to the outriggers during step b).

15. The method of claim 14, wherein step c) is characterized by the outriggers remaining spatially fixed.

16. The method of claim 14, wherein step c) is performed as part of a track following operation.

17. The method of claim 14, wherein each of the outriggers are adapted to induce a subambient pressure condition between the tape and the respective outrigger, and further wherein step c) is characterized by the absence of tape drag relative to lateral movement of the central section.

18. The method of claim 14, wherein at least the first outrigger forms a longitudinal slot having a width less than a width of the magnetic tape, the method further comprising:
    forcing the tape into the longitudinal slot during step b) to laterally constrain the tape.

19. A magnetic tape system for recording, reproducing, and/or erasing magnetic information in a linear tape system, the magnetic tape system comprising:
    a magnetic tape; and
    a magnetic head assembly including a magnetic head comprising:
        a central section maintaining at least one read/write element,
        a first outrigger adjacent the central section and forming at least one air bleed slot,
        a second outrigger adjacent the central section opposite the first outrigger, the second outrigger forming at least one air bleed slot;
    wherein the central section is laterally moveable relative to the outriggers and the magnetic tape.

20. The magnetic tape system of claim 19, wherein the first outrigger defines a longitudinal slot for laterally constraining the magnetic tape as the magnetic tape moves longitudinally across the first outrigger.

* * * * *